Nov. 4, 1952 W. H. SILVER ET AL 2,616,345
TRACTOR MOUNTED TWO-WAY PLOW
Filed May 13, 1950 5 Sheets-Sheet 1

FIG. 1

INVENTORS.
WALTER H. SILVER, WILLIAM V. LOHRMAN
BY
ATTORNEYS.

Nov. 4, 1952 — W. H. SILVER ET AL — 2,616,345

TRACTOR MOUNTED TWO-WAY PLOW

Filed May 13, 1950 — 5 Sheets-Sheet 2

INVENTORS.
WALTER H. SILVER, WILLIAM V. LOHRMAN
BY
ATTORNEYS.

Nov. 4, 1952  W. H. SILVER ET AL  2,616,345
TRACTOR MOUNTED TWO-WAY PLOW
Filed May 13, 1950  5 Sheets-Sheet 4

FIG. 6

INVENTORS
WALTER H. SILVER
WILLIAM V. LOHRMAN
BY
ATTORNEYS

Nov. 4, 1952 W. H. SILVER ET AL 2,616,345
TRACTOR MOUNTED TWO-WAY PLOW
Filed May 13, 1950 5 Sheets-Sheet 5

INVENTORS.
WALTER H. SILVER
WILLIAM V. LOHRMAN
BY
ATTORNEYS

Patented Nov. 4, 1952

2,616,345

UNITED STATES PATENT OFFICE 2,616,345

TRACTOR MOUNTED TWO-WAY PLOW

Walter H. Silver, Moline, Ill., and William V. Lohrman, Davenport, Iowa, assignors to Deere & Company, Moline, Ill., a corporation of Illinois Application May 13, 1950, Serial No. 161,802
In Canada October 10, 1946

9 Claims. (Cl. 97—26)

This application is a continuation-in-part of our co-pending application, Serial No. 622,280, filed October 15, 1945.

The present invention relates generally to agricultural implements and more particularly to implements such as two-way plows and the like.

The object and general nature of the present invention is the provision of a two-way plow of integral or tractor-mounted type in which the implement unit is supported entirely on the tractor. Further, it is a feature of this invention to provide a two-way plow which is simple and inexpensive and which can be controlled conveniently from the operator's station on the tractor. Additionally, it is a feature of this invention to provide a two-way plow of the quick attachable type, in which the implement as a unit may readily be connected to or disconnected from the tractor by the removal of a single connecting pin.

A further feature of this invention is the provision of a two-way plow of the type in which right- and left-hand plow bottoms are employed and are swingable about a generally longitudinal axis into and out of operating position, which is especially constructed and arranged to be carried directly by a mobile support, such as a conventional farm tractor or the like. Additionally, it is another feature of this invention to provide improved means for swinging the plowing units from one position to another, which means may readily be operated by a person sitting on the tractor, regardless of whether the right-hand plowing unit or the left-hand plowing unit is in operating position, and still further, it is a feature of this invention to provide new and improved lever and detent means whereby two levers are employed for swinging the plowing units, so that at least one is always in convenient reach of the operator.

Another feature of this invention is the provision of new and improved draft connections, especially of the quick attachable type, whereby shock loads are cushioned.

These and other objects and advantages of the present invention will be apparent to those skilled in the art after a consideration of the following detailed description of the preferred structure in which the principles of the present invention have been incorporated.

In the accompanying drawings:

Figure 4 is a fragmentary plan view of a two-way plow substantially the same as that shown in Figures 1–3 but embodying a spring cushion connection so as to cushion shock loads and the like;

Figure 5 is a fragmentary side view of the implement shown in Figure 4;

Figure 1:
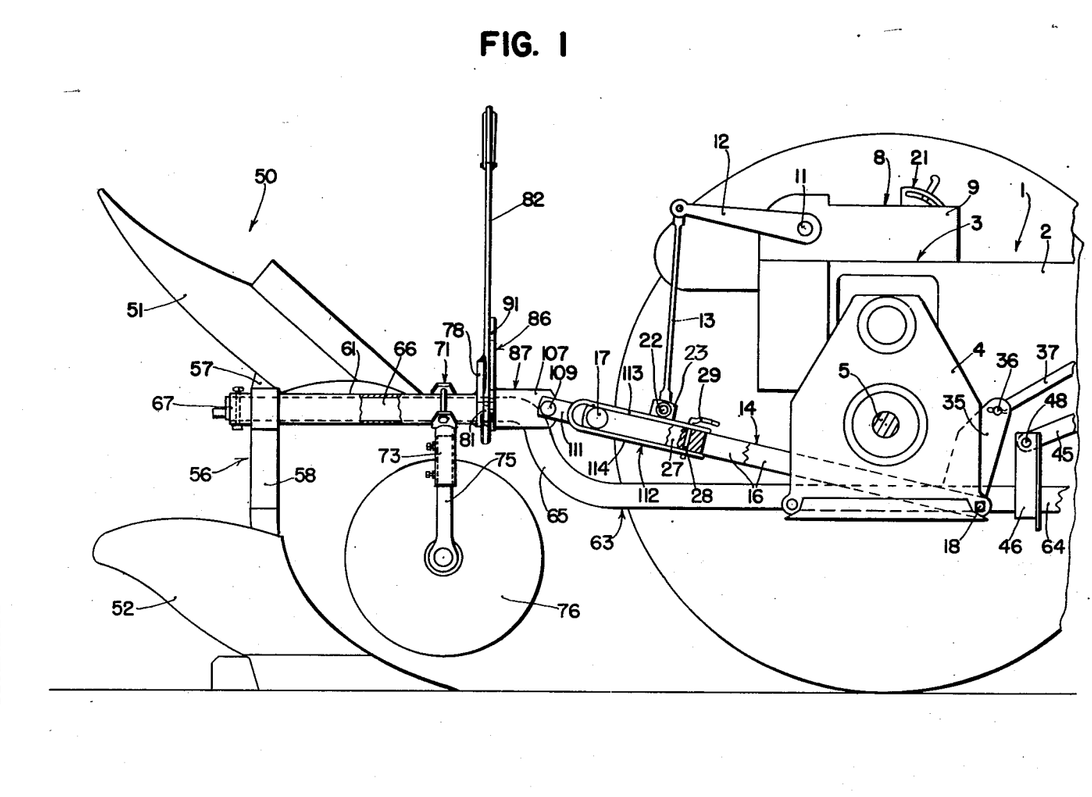
Figure 1 is a side view of one form of tractor-mounted two-way plow in which the principles of the present invention have been embodied.
Figure 2:
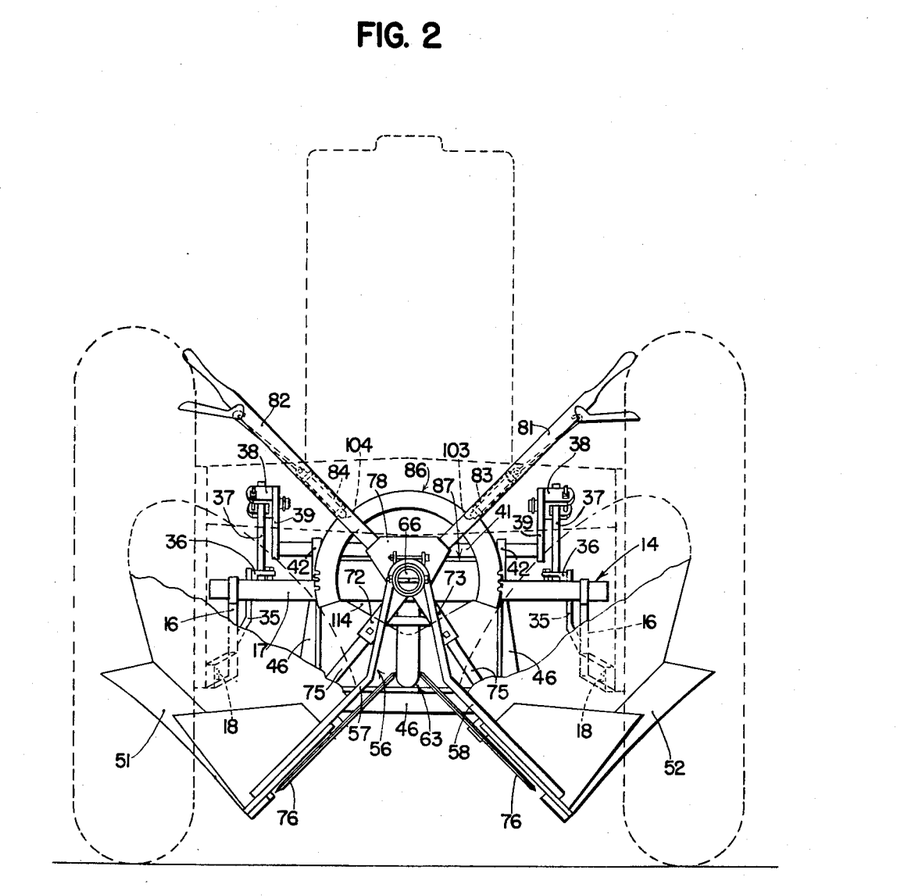
Figure 2 is a rear view of the plow shown in Figure 1, with the right- and left-hand plow bottoms arranged in transport position, the power lift unit and associated lifting linkage being omitted for purposes of clarity.
Figure 3:
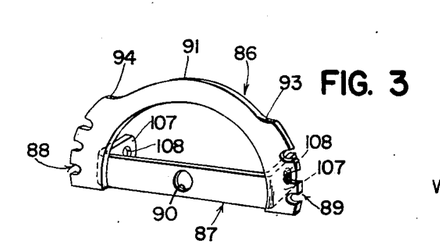
Figure 3 is a detail view showing the notched sector and its mounting on the hitch.

Referring now more particularly to the form of the invention shown in Figures 1–3, the reference numeral 1 indicates a farm tractor of more or less conventional construction, so far as the present invention is concerned, embodying a source of power mounted on frame means 2 at the rear of which is a rear axle structure 3 including a pair of drop housings 4 which enclose means for driving rear axle spindles 5. Also mounted on the rear of the tractor is a power lift unit 8, which includes a cylinder 9 in which a piston is moved in one direction by hydraulic power, the piston being connected to a rockshaft 11 which carries a pair of arms 12. The rear ends of the arms are connected by a pair of links 13 to a tractor drawbar or bail construction 14. The latter includes a pair of side bars 16 and a rear bar 17 welded to the ends of the side bars 16. The forward ends of the side bars are pivoted to the forward portions of the drop housings 4 by any suitable means, such as bolts 18. The power lift unit 8 is controlled by a valve structure 21 and acts through the links 13 to raise the tractor drawbar or bail 14 or to permit the latter to lower. The lower links 13 are pivoted to the side bars 16 by means of pins 22 which extend through apertures in the lower ends of the links 13 and through apertures in lugs 23 that are welded to the tractor drawbar. A draft bracket in the form of a generally triangular block 27 is welded to the central portion of the rear drawbar member 17, and extends forwardly and is apertured, as at 28, to receive a draft pin 29.

A pair of arms 35 are fixed to the forward portions of the bail side arms 16 and are apertured at their upper ends to receive swivel pins 36 which are adjustably fixed to the rear ends of links 37 that extend forwardly and upwardly at opposite sides of the tractor and are connected by swivel pins 38 to the upper ends of a pair of arms 39 that are fixed to a cross shaft 41 that is supported in a pair of brackets 42 that are detachably connected with the tractor frame. A pair of rearwardly and downwardly extending arms 45 are fixed at their forward ends to the cross shaft 41 and carry a transverse bail member 46. Preferably, the rear ends of the arms 45 are apertured to receive a transverse rod 48 that extends across underneath the tractor, and the upper ends of the bails are apertured to receive the cross rod 48. Thus, whenever the power lift unit 8 is operated to raise or lower the tractor drawbar bail 14, the forward bail 46 is also raised and lowered a corresponding amount.

The two-way plow implement with which the present invention is more particularly concerned is indicated in Figures 1 and 2 by the reference numeral 50. The implement 50 includes a left-hand plow bottom 51 and a right-hand plow bottom 52 rigidly connected together by a generally V-shaped double plow bottom standard 56, one portion 57 of which supports the left-hand plow bottom while the other portion 58 thereof supports the right-hand plow bottom. The double standard 56 is secured, as by welding, to the rear end of a sleeve 61 that is rockably mounted on the rear end of a generally longitudinally extending beam or frame bar 63. The latter member includes a forward section 64 that at its forward end rests on the forward bail member 46, and the member 63 is bent upwardly, as at 65 (Figure 1), so as to provide a rear elevated section 66 on which the rockable sleeve 61 mentioned above is mounted. A collar 67 is fixed to the rear end of the frame bar 63 and serves to retain the sleeve 61 in position on the rear end of the frame bar 63.

At its forward end the sleeve 61 receives a double clamp member 71 having two socket sections 72 and 73, each of which is adapted to receive a shank 75 on the lower end of which a rolling colter 76 is mounted. Forward of the double support 71, a plate 78 is welded or otherwise secured to the front end of the sleeve 61 and a pair of hand levers 81 and 82 are fixed thereto. Each hand lever carries a suitable detent mechanism, as shown at 83 and 84, which operates along an arcuate sector 86 that is welded to a generally U-shaped draft bracket 87, best shown in Figure 3. The draft bracket 87 is apertured at 90 (Figure 3) to receive the rear part 66 of the beam 63 and to which part 66 the bar 90 is welded, whereby draft is transmitted from the bracket or yoke 87 to the bar 66 and from the latter through the collar 67 to the sleeve 61. The sector 86 is notched, having two sets of notches, as shown at 88 and 89, respectively, and a central section 91, which may be considered as an elongated notch, with shouldered portions 93 and 94 spaced apart and disposed adjacent the two sets of notches 88 and 89. The hand levers 81 and 82 are fixed to the plate 78 so as to be disposed approximately at right angles to one another, although this is not critical, and the shouldered portions 93 and 94 of the central section 91 of the sector 86 are spaced so that in the neutral position of the two plow bottoms, as shown in Figure 2, one detent plunger 103 is disposed against the shoulder 93 when the other detent plunger 104 is disposed against the shoulder 94.

The forward portions 107 of the draft bracket 87 are apertured, as at 108, to receive attaching pins 109 (Figure 1) which extend through pairs of apertured lugs 111 that are secured to a quick detachable saddle or hitch member 112. The latter member, best shown in Figure 1, is preferably formed of plate stock bent into generally U-shape, with upper and lower portions 113 and 114 generally triangular in shape and apertured at their forward portions to receive the attaching pin 29. Thus, merely by inserting or removing a single member, namely, the pin 29, the implement 50 may be connected to or disconnected from the tractor, it being understood that the forward end 64 of the member 63 slides in and out with respect to the forward bail 46 on the tractor when connecting and disconnecting the implement.

In operation, the implement may be lowered into operating position by opening the valve of the hydraulic unit 8 to permit the drawbar bail 14 to lower under the action of the weight of the tools connected therewith, as shown in Figure 1. The depth of plowing is controlled by raising or lowering the bail 14, and when it is desired to raise the tools out of their plowing position, as for transport, the power lift 8 is operated to raise the bail 14, and then the two plow bottoms 51 and 52 are swung into an intermediate position, as shown in Figure 2. In this position, the two hand levers 81 and 82 are disposed on opposite sides of the operator's seat 15 and the detent plungers 103 and 104 seat, respectively, against the shoulders 93 and 94 of the sector 86. Looking at Figure 2, it will be clear that if the operator should desire to plow with the left-hand bottom 61, all that he needs do is to reach over and grasp the left-hand lever 82, release the detent plunger 104 from the shoulder 94 and then push downwardly on the hand lever 82 to swing the plows into a position lowering the left-hand unit 51 and raising the right-hand unit 52. During this action it is not necessary for the operator to manipulate the hand lever 81, since in this left-hand swinging of the plows, the detent plunger 103 on the lever 81 merely slides along the portion 91 of the sector 86, away from the shoulder 93, and it is not necessary to disengage the detent plunger 103 from the sector 86. Similarly, if the operator should desire to swing the right-hand plow bottom 52 into operating or plowing position, all that he needs do is to grasp the right-hand lever 81, disengage the detent plunger 103 from the shoulder 93, and then swing the hand lever 81 downwardly until the plunger is in a position to engage one of the notches 89. When swinging the left-hand plow into position the operator permits the detent plunger 104 to engage one of the notches 88. The notch, 88 or 89, that is selected by the operator depends upon the depth at which he desires to plow. As will be understood, when plowing with one rear wheel in the previously opened furrow, the tractor is operated in a tipped or tilted position, and the greater the depth of plowing the more the tilt of the tractor. Hence, when plowing deep, the hand lever detent of the down bottom is engaged with one of the uppermost notches, at one side or the other of the sector 86, while one of the lowermost notches is engaged when plowing at the more shallow depths. While we have shown only three notches at each side of the sector 86, it is to be understood that a greater number or a smaller number of notches may be employed. For example, a relatively small number of notches have proven satisfactory where detent mechanism of the double-dog type, that is, a type having two detent plungers side by side, is used.

Figures 4, 5:
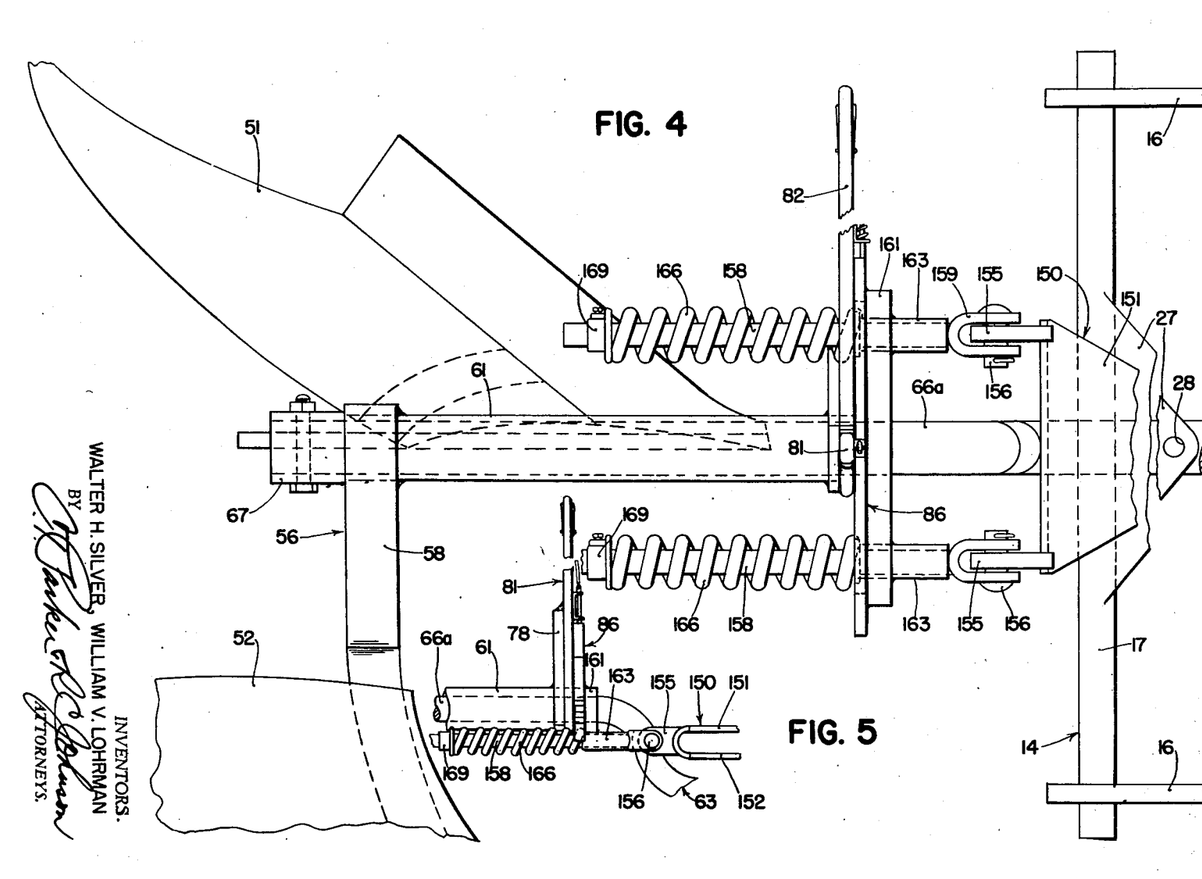

A modified form of the present invention is shown in Figure 4. This form of the invention is quite similar to that described above, and wherever the parts are identical with the invention as described above, the same reference numerals are used. Referring now to Figure 4, the frame bar 63 is, in this form of the invention, formed with an elongated rear section 66a, somewhat longer than the corresponding section shown in Figure 1. In this form of the invention, as in the form described above, the right- and left-hand plow bottoms 51 and 52 are secured to the sleeve 61 which is held on the frame bar section 66a by a collar 67. A pair of hand levers are fixed to the front end of the sleeve 61 in substantially the same manner as described above. However, in Figure 4 we have shown a spring cushion type of connection to the saddle member that is adapted to be connected by a pin to the tractor drawbar 14. The saddle member shown in Figure 4 is indicated by the reference numeral 150 and comprises upper and lower triangular sections 151 and 152 formed of plate stock and apertured to receive a pin, such as the pin 29 (Figure 1), which is adapted to connect the saddle 150 to the drawbar draft bracket 27. A pair of lugs 155 are fixed to the saddle 150 and are apertured to receive hitch pins 156. A pair of eyebolts 158 are provided with forward apertured and bifurcated ends 159 through which the pivot pins 156 extend. Each eyebolt 158 extends rearwardly through a generally rectangular connecting bar 161 to which forwardly extending short sleeves 163 are secured, as by welding. The rectangular plate 161 is apertured to receive the rear section 66a of the main frame bar, and in this form of the invention the sector 86 is welded to the bar 161. Springs 166 are disposed about the rear portions of the eyebolts 158, the latter carrying set screw collars 169 to receive the rear ends of the springs 166. The lever and detent mechanism in the form of the invention shown in Figure 4 is the same as described above. As best shown in Figure 5, the sleeves 163 through which the eyebolts 158 extend are welded to the lower edge of the rectangular draft bar 161. In this form of implement, the implement unit is readily detachable from and connectible to the tractor in the same way as described above, namely, by insertion and removal of the pin 29, after backing the tractor into a position bringing the drawbar member 17 into the saddle member 150, as shown in Figure 4.

It will be noted from Figure 2 that the right- and left-hand portions 58 and 57 of the double plow bottom standard 56 are offset. The advantage of this construction is that larger plow bottoms may be accommodated while permitting the use of relatively narrow tread tractors than would be the case if the plow standards 57 and 58 were straight or substantially radial with respect to the axis of rocking of the sleeve 61 on the beam section 66. However, it is preferable to employ two separate colters where the offset plow bottom standard is used, this being the construction shown in Figure 2.

Figure 6:
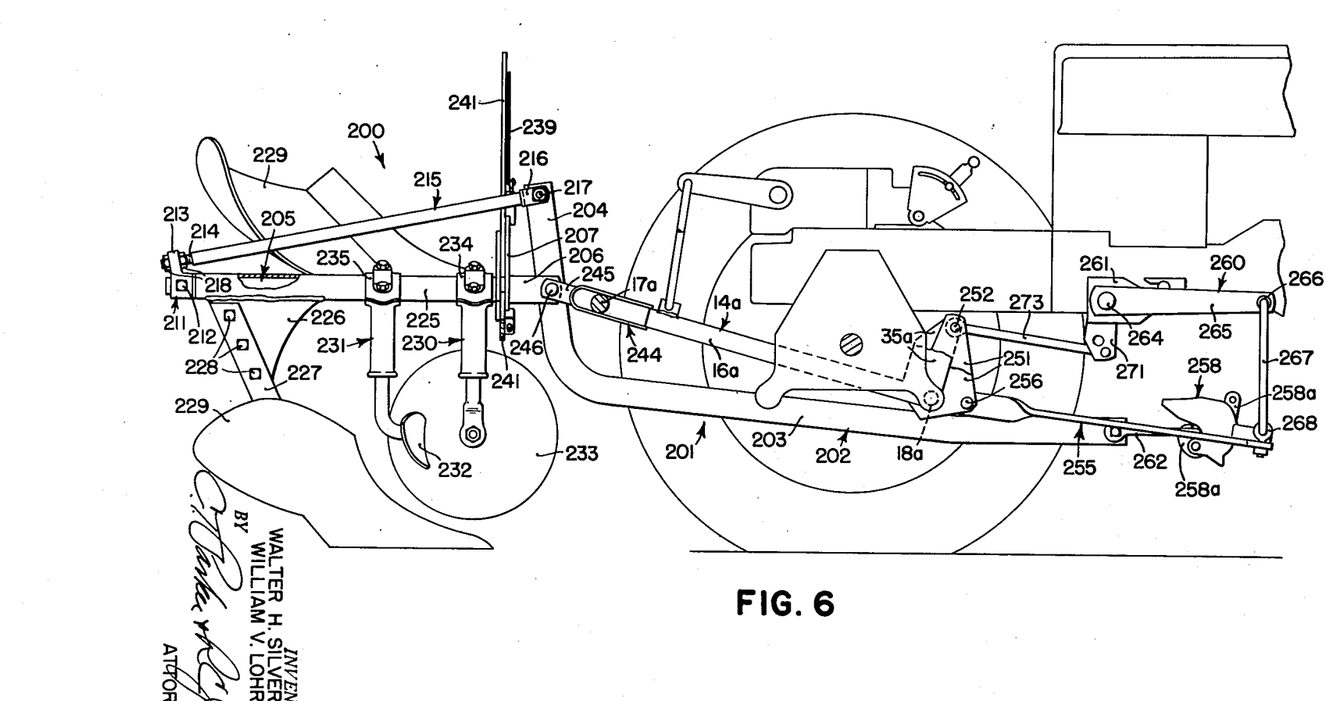
Figure 6 is a side view of another form of this invention, showing a different form of hitch construction, especially adapted to be used with overload release mechanism.
Figure 7:
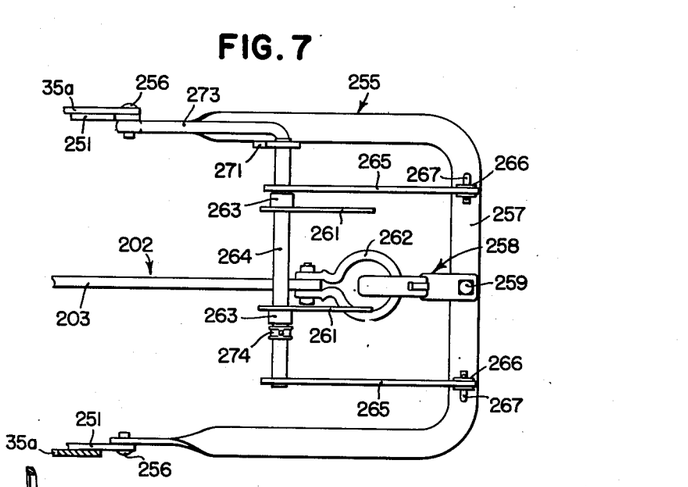
Figure 7 is a plan view of the implement shown in Figure 6, showing the front portion only of the implement, particularly its hitch connections.

Referring now to the form of the invention shown in Figures 6 and 7, the implement is indicated in its entirety by the reference numeral 200 and includes a beam or frame bar construction 201 which includes a forward control bar 202 having a forwardly extending section 203 and an upwardly extending section 204 to which a rearwardly extending frame bar section 205 is pivotally connected. The bar section 205 has a transverse part in the form of a yoke 206 secured to the forward end of the bar 205 in any suitable way, as by welding or the like, and the yoke 206 carries a sector 207 which is similar to or substantially identical with the sector 86 described above. A collar 211 is fixed, as by a bolt 212, to the rear end of the frame bar 205 and includes an upper apertured lug portion 213 which receives the rear threaded end 214 of a strut member 215, the forward end of which carries a yoke 216 by which the strut 215 is pivotally connected, as at 217, to the upper end of the upwardly extending portion 204 of the frame bar 202. Lock nuts 218, lying on opposite sides of the lug 213, serve to fix the strut 215 to the lug, whereby the frame bar 205 is connected rigidly with and actually serves as a part of the frame bar or control bar 202. By virtue of the adjustable connection between the rear end of the strut 215 and the rear end of the bar 205, the position of the latter relative to the bar 202 may be adjusted before, during or after assembly of the plow, whereby the latter may properly be set up for operation, irrespective of manufacturing tolerances, whereas in the form of the invention described above and shown in Figures 1–5, the position of the rear beam section 66 relative to the forward section 64 is not ordinarily changed.

A sleeve member 225 is mounted for rocking movement on the frame bar 205 between the yoke 206 and the rear collar 211, and fixed in the desired angular relation to the rear end of the sleeve 225 is a pair of attachment plates 226 to each of which a plow standard 227 is fixed, as by bolts 228. Each standard carries a plow bottom 229, which may be substantially the same as the plow bottoms 51 and 52 described above. Also fixed to the sleeve, and disposed between the plow bottoms and the yoke 206 on the bar 205, are a generally Y-shaped colter-supporting bracket 230 and a generally Y-shaped jointer-supporting bracket 231. The latter carries a pair of jointers 232 and the bracket 230 carries a pair of colters 233. The brackets 230 and 231 are fixed to the sleeve 225 by means including clamping bolts and clamping collars 234 and 235. Also fixed to the forward end of the sleeve 225 is a generally triangular plate 237 to which a pair of hand levers 238 and 239 are connected. Each of these levers includes detent mechanism operating in conjunction with the sector 207 in substantially the same way as described above in connection with the hand levers 81 and 82. It will be noted, however, that the lower portions of the hand levers 238 and 239 are bent laterally outwardly, as indicated at 241, and that the sector 207 lies generally below the upper end of the bar portion 204. Thus, space is provided for the strut 215, the hand lever 238 operating at one side of the strut while the other hand lever 239 operates at the other side. A hitch member 244, substantially identical with the hitch member 112 described above, carries two pairs of rearwardly extending apertured lugs 245, and each pair of said lugs receives a hitch pin 246 by which the adjacent part of the yoke 206 is pivotally connected therewith. Additionally, the hitch member 244 carries a central pair of apertured lugs 248 which receive a pin or bolt 249 by which the section 204 of the control bar or beam is pivotally connected with the hitch member 244. The pin or bolt 249 lies in axial alignment with the hitch pins 246. In this form of the invention the hitch member 244 is engageable with the transverse member 17a of the tractor drawbar substantially the same as the corresponding parts shown in the form of the invention described above. However, in this form of the invention, the hitch member 244 is not connected by a hitch pin to the tractor drawbar, such as the hitch pin 29 shown in Figure 1; instead, the hitch member 244 is free to slide rearwardly off the tractor drawbar, forward draft being transmitted to the implement through the front end of the bar or beam 202. Preferably, this hitch connection includes overload release means, and such hitch connection will now be described.

Referring first to the tractor drawbar 14a, which is substantially like the tractor drawbar 14 described above but having slightly different side members 16a, it will be noted that secured to the front upwardly extending arms 35a of the tractor drawbar 14a are a pair of generally triangular plates 251 which are apertured to receive a bolt 252 fixing the plates to the associated tractor drawbar arms 35a, the plates 251 being apertured to receive the pivots 18a by which the tractor drawbar is connected to the tractor drop housings. A forwardly extending U-shaped implement drawbar 255 is connected at 256 to the two plates 251. The implement drawbar 255 includes a forward transverse section 257 to which a releasable hitch unit 258 is connected, as by a pin or bolt 259. The overload release unit 258 is of conventional construction, so far as the present invention is concerned, being substantially like that shown in U. S. Patent 1,872,750. The rear end of the unit 258 is connected by a swivel member 262 to the front end of the control bar section 203.

The implement drawbar 255 is controlled by bell crank means 260 arranged to be carried by the tractor and operatively connected with the upper portions of the drawbar plates 251. The unit 260 comprises a pair of side plates 261 adapted to be conected to a tractor in substantially the same way as the attaching plates 42 described above. Rockably mounted in bearing portions 263 of the plates 261 is a cross shaft 264 to the end portions of which generally horizontal control arms 265 are fixed, as by welding. The free ends of the arms 265 carry bushings 266 in each of which the upper end of a vertically disposed link 267 is swingably connected. The lower end of each of the links 267 is pivotally connected by an eyebolt 268 or the like to the forward portion of the implement drawbar 255. An actuating arm 271 is connected to the left end of the cross shaft 264 and extends downwardly therefrom, having a pair of openings 272 into either of which the forward end of an actuating link 273 may be disposed. The rear end of the link 273 is connected to the upper end of the associated drawbar plate 251 by the same bolt 252 that holds the plate 251 to the tractor drawbar arm 35a. As best shown in Figure 7, the left-hand arm 265 is disposed against the left-hand bearing member 263, and disposed against the right-hand bearing member 263 is a set screw collar 274 that is fixed to the shaft 264 for the purpose of cooperating with the right-hand bracket 261 for holding the shaft 264 against lateral displacement relative to the tractor.

Figure 8:
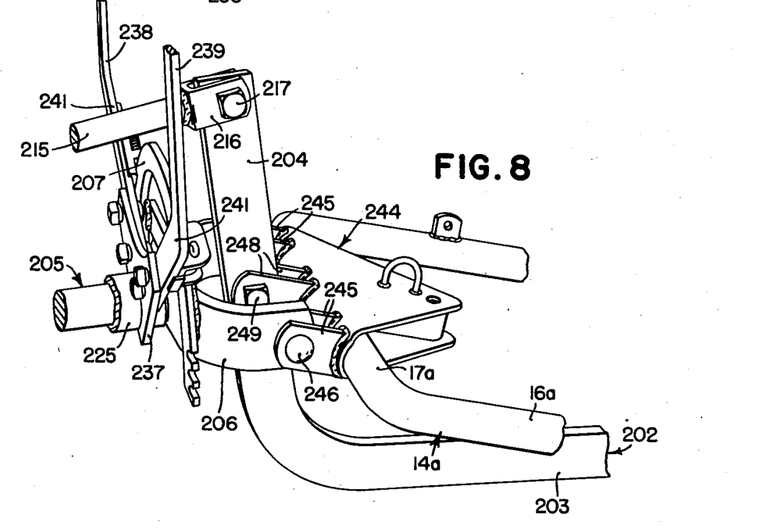
Figure 8 is a fragmentary perspective view showing the connection of the implement with the drawbar of the tractor, which connection is so constructed and arranged as to permit the implement to free itself from the tractor drawbar when the overload release unit, by which the forward portion of the implement is connected to the tractor, is tripped, as under overload conditions.

The operation of the two-way plow just described is substantially the same as the operation of the two-way plow shown in Figures 1–5, and hence further description is believed to be unnecessary. As mentioned above, minor variations in the control bar or beam 202 and the rear bar section 205, within the usual manufacturing tolerances, may be taken care of by adjusting the rear end of the strut 215 relative to the collar 211. In this form of the invention, as well as in the first form of the invention described above, raising and lowering the tractor drawbar through the tractor power lift mechanism serves to raise both front and rear ends of the plow beam. In the last form of the invention just described, if either of the plow bottoms should strike an obstruction which might overload the plow or the tractor, the overload release unit 258 will trip, releasing the front end of the bar 203 from the implement hitch member 255, whereupon the implement is released from the tractor, the hitch member 244 merely sliding away from the transverse part of the tractor drawbar. To reconnect the implement to the tractor after a release all that it is necessary to do is to back the tractor so as to start the tractor drawbar into the hitch member 244, and then by operating the tractor power lift the implement drawbar 255, carrying with it the releasable hitch unit 258, can be raised or lowered so that upon further backing of the tractor relative to the implement the arm member 262, which preferably is fixed to the front end of the bar 203, will be reengaged by the release unit 258. The latter unit incldes a part 258a which when actuated releases the plow beam therefrom.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A two-way plow adapted to be connected to a tractor, comprising a generally longitudinally extending beam construction including a front section having rearwardly thereof an upturned portion, and a rear section, a pair of right- and left-hand furrow opener units swingably mounted in fixed relation with respect to one another on said rear beam section, a transverse member fixed to the forward portion of said rear beam section and including a pair of laterally spaced apart, generally forwardly extending apertured attaching portions, a hitch member adapted to be conected with the tractor so as to be rigidly held against movement relative to the tractor about a generally fore-and-aft extending axis, means for pivotally connecting said hitch member with said apertured portions for swinging movement about a generally transverse axis and so that said hitch member extends generally forwardly therefrom at the forward side of said upturned beam portion, means connected with said furrow opener units for swinging them from one side to the other relative to said rear beam section, latching means acting between said furrow opener swinging means and said transverse member for holding said furrow openers against swinging relative to said hitch member, and means pivotally connecting the generally central portion of said hitch member to said upturned beam portion substantially in alinement with the axes of pivotal connection of said hitch member with said transverse member.

2. A two-way plow adapted to be connected to a tractor, comprising a generally longitudinally extending beam construction including a front section having rearwardly thereof an upturned portion, and a rear section, a pair of right- and left-hand furrow opener units swingably mounted in fixed relation with respect to one another on said rear beam section, a transverse member fixed to the forward portion of said rear beam section and including a pair of laterally spaced apart, generally forwardly extending apertured attaching portions, a hitch member adapted to be connected with the tractor so as to be rigidly held against movement relative to the tractor about a generally fore-and-aft extending axis, means for pivotally connecting said hitch member with said apertured portions for swinging movement about a generally transverse axis and so that said hitch member extends generally forwardly therefrom at the forward side of said upturned beam portion, means connected with said furrow opener units for swinging them from one side to the other relative to said rear beam section, latching means acting between said furrow opener swinging means and said transverse member for holding said furrow openers against swinging relative to said hitch member, said upturned beam portion extending upwardly above said rear beam section, and an adjustable strut connecting the upper end of said upturned portion with the rear end of said rear beam section.

3. A two-way plow adapted to be connected to a tractor having a generally vertically swingable drawbar provided with a rear transverse portion, said plow comprising a beam structure extending generally longitudinally and including a forward beam section having at its rear end an upturned portion and a rear beam section including a transverse member fixed at the forward end of said rear section, a hitch member shaped to provide a transversely extending, forwardly facing socket member adapted to be disposed over the transverse portion of said tractor drawbar and constrained to tilt laterally with the drawbar and the tractor, means hingedly connecting said transverse member with said hitch member at laterally spaced apart points, and means pivotally connecting the upturned portion of said forward beam section to said hitch member at a point intermediate of and in line with the points of pivotal connection between the transverse member and said hitch member.

4. The invention set forth in claim 3, further characterized by a pair of right- and left-hand furrow opener units swingably mounted on said rear beam section, hand lever means connected to swing said furrow opener units, and a sector cooperating with said hand lever means and fixedly connected with said transverse member, whereby said sector, when the hand lever means is locked to said sector, reacts through said transverse member against the hitch member for holding the furrow opener units in position relative to the tractor.

5. The invention set forth in claim 4, further characterized by said upturned beam portion extending upwardly above said rear beam section, a strut connected at its forward end with the upper end of said upturned beam portion and connected at its rear end with the rear end of said beam section, and said hand lever means including a pair of hand levers, one disposed at each side of said strut, either of said hand levers, when engaged with said sector, reacting against said transverse member and said hitch member for holding said furrow opener units in position.

6. A two-way plow adapted to be connected to a tractor having an operator's station thereon, comprising a beam structure extending generally longitudinally and including a forward section having an upturned portion at its rear end and a forwardly extending portion, and a rear section pivotally connected at its forward end with said forward section below the upper end of said upturned portion, an adjustable strut connecting the rear part of said rear beam section with the upper end of said upturned portion, means for connecting the forward portion of said rear beam section with the tractor so as to tilt laterally therewith, a pair of right- and left-hand furrow opener units swingably mounted in fixed relation with respect to one another on said rear beam section, a pair of hand levers arranged at an angle to one another and each fixed to said furrow opener units whereby movement of either hand lever will shift both of said units simultaneously so as to carry one into plowing position and the other out of plowing position, said hand levers being angled and shaped so as to lie at opposite sides of said strut and each swingable toward and away from the strut when shifting said furrow openers, a common sector for both of said hand levers, each of the latter having detent means, and means connecting said sector with said rear beam section so as to be held therewith against lateral movement relative thereto about a generally fore and aft extending axis.

7. A two-way plow adapted to be connected to a tractor having an operator's station thereon, comprising a beam structure extending generally longitudinally and including a forward section having an upturned portion at its rear end and a rear section pivoted at its forward end to the rear end of said forward section, a transverse part connected with the forward portion of said rear section and having laterally spaced apart portions adapted to be connected with the tractor, a pair of right- and left-hand furrow opener units swingably mounted in fixed relation with respect to one another on the rear beam section, a strut connected at its rear end to the rear end of said rear beam section and extending upwardly and forwardly and connected at its forward end to the upper end of said upturned portion of the forward beam section, a pair of hand levers arranged at an angle to one another on opposite sides of said strut and each fixed to said furrow opener units whereby movement of either hand lever will shift both of said units simultaneously so as to carry one into plowing position and the other out of plowing position, a common sector for both of said hand levers, each of the latter having detent means, means fixing said sector to said transverse part, and said sector having a pair of separated notched areas for cooperation with said detent means, respectively.

8. A two-way plow adapted to be connected to a tractor having a generally vertically swingable drawbar provided with a rear transverse section, said plow comprising a beam structure including a forward beam section adapted to extend underneath the tractor, a rear beam section pivotally connected at its front end with said forward beam section, a pair of furrow opener units fixedly connected with one another and both mounted for swinging movement on the rear beam section, hitch means for connecting the forward portion of said rear beam section to the tractor drawbar including a transverse part fixed to the forward end of said rear beam section, a transversely extending socket member hingedly connected with said transverse part and adapted to receive the transverse section of said tractor drawbar, said socket member being open at its forward portion so as to be free for rearward movement relative to the transverse section of the tractor drawbar when the plow is to be disconnected from the tractor, means for swinging said furrow opener units from one side to the other including hand lever means fixed to move with said furrow opener units and a sector fixed to said transverse part, a draft-transmitting structure adapted to be connected to the tractor adjacent the forward end of said forward beam section and including a member movable generally vertically relative to the tractor, means for connecting said vertically movable member with the tractor drawbar, and an overload release connection between the forward end of said forward beam section and said vertically shiftable member, the plow being disconnected from the tractor when said overload release connection releases by virtue of the rearward movement of said socket member away from the transverse section of the tractor drawbar.

9. The invention set forth in claim 8, further characterized by said vertically movable draft-transmitting member comprising a U-shaped part swingably connected at its rear ends with the forward portions of said tractor drawbar, a bell crank adapted to be mounted on the tractor and having one arm connected with the forward portion of said U-shaped member, and an arm fixed to one side of the tractor drawbar and link-connected with an arm of said bell crank for swinging the latter whenever the tractor drawbar is raised and lowered.

WALTER H. SILVER.
WILLIAM V. LOHRMAN.

REFERENCES CITED

The following references are of record in the file of this patent:

UNITED STATES PATENTS

| Number | Name | Date |
| --- | --- | --- |
| Re. 22,627 | McKay | Apr. 3, 1945 |
| 199,036 | Daniel | Jan. 8, 1878 |
| 1,076,001 | Butterfield | Oct. 14, 1913 |
| 1,800,284 | Delaye | Apr. 14, 1931 |
| 2,035,150 | Dufour | Mar. 24, 1936 |
| 2,227,366 | Pridgen | Dec. 31, 1940 |
| 2,429,463 | Hurlimann | Oct. 21, 1947 |
| 2,440,550 | Martin | Apr. 27, 1948 |
| 2,534,971 | Henriod | Dec. 19, 1950 |

FOREIGN PATENTS

| Number | Country | Date |
| --- | --- | --- |
| 371,580 | Italy | May 29, 1939 |
| 182,630 | Switzerland | May 1, 1936 |